United States Patent [19]

Steere, Jr. et al.

[11] Patent Number: 4,537,177
[45] Date of Patent: Aug. 27, 1985

[54] BALANCED ROTARY SAW ASSEMBLY AND A METHOD OF BALANCING THE SAME

[75] Inventors: Robert E. Steere, Jr., Boonton; Thomas Lewandowski, Wanaque, both of N.J.

[73] Assignee: Silicon Technology, Oakland, N.J.

[21] Appl. No.: 490,664

[22] Filed: May 2, 1983

Related U.S. Application Data

[63] Continuation-in-part of Ser. No. 376,173, May 7, 1982, abandoned.

[51] Int. Cl.³ .............................................. B28D 1/04
[52] U.S. Cl. ................................ 125/13 R; 51/73 R; 51/169; 74/573 F; 73/468
[58] Field of Search ............ 73/468; 74/573 R, 573 F; 51/169, 73 R; 125/15, 13 R

[56] References Cited

U.S. PATENT DOCUMENTS

| | | | |
|---|---|---|---|
| 2,713,339 | 7/1955 | Sayers | 125/15 |
| 3,039,235 | 6/1962 | Heinrich | 51/73 R |
| 3,191,997 | 6/1975 | Colvert | 73/458 X |
| 3,812,724 | 5/1974 | Curtz | 73/468 |
| 3,950,897 | 4/1976 | Birkenstack | 51/169 |
| 4,002,086 | 1/1977 | Reinhall | 51/169 |
| 4,432,253 | 2/1984 | Kerlin | 74/573 R |

FOREIGN PATENT DOCUMENTS

| | | | |
|---|---|---|---|
| 2912079 | 12/1979 | Fed. Rep. of Germany | 74/573 F |
| 1426506 | 3/1976 | United Kingdom | |
| 2097101 | 10/1982 | United Kingdom | 74/573 R |
| 369442 | 8/1973 | U.S.S.R. | 51/169 |
| 691708 | 10/1979 | U.S.S.R. | 73/468 |

Primary Examiner—Harold D. Whitehead
Attorney, Agent, or Firm—Kenyon & Kenyon

[57] ABSTRACT

The saw assembly is provided with a self-contained balancing means for the automatic balancing of the wheel head. In one embodiment, the balancing means includes an annular rotor which is mounted on the wheel head and which contains a vaporizable fluid medium within circumferentially spaced chambers. Heating elements are provided for heating selected chambers in order to vaporize and transfer the balancing medium between chambers via a capillary manifold tube, or pneumatic means is used to transfer the balancing medium. Sensors are provided to sense the rotation of the wheel head and the radial vibration of the wheel head and cutting blade of the saw assembly in order to determine where the wheel head is out-of-balance.

12 Claims, 6 Drawing Figures

BALANCED ROTARY SAW ASSEMBLY AND A METHOD OF BALANCING THE SAME

This is a continuation-in-part of pending U.S. patent Ser. No. 376,173, filed May 7, 1982 and now abandoned.

This invention relates to a balanced rotary saw assembly and to a method of balancing a rotary saw assembly.

As is known, rotary saw assemblies having an internal diameter blade have been used for severing wafers of material from an ingot such as a crystal of silicon, germanium, and the like, for use in the semi-conductor industry. Generally, during a severing operation, the blade moves perpendicularly to the axis of the crystal and forms a groove-like cut between the wafer being severed and the remainder of the ingot. However, if the saw assembly is not balanced, excessive vibration may occur in the blade so that cracks occur in the wafer and ingot at the base of the cut, and particularly, at the corners of the cut. In such cases, the faces of the severed wafer require polishing in order to remove the cracks. As a result, the finished wafers are smaller in thickness than the originally cut wafers. Further, there is a waste of material as well as the need for an additional polishing operation. All of these lead to a more expensive finished wafer.

In addition, if very thin wafers are to be severed, undue vibration may cause cracking to such an extent that a surface cannot be polished without damage to the wafer.

Although the problems caused by an out-of-balance saw assembly have been recognized, balancing of the saw assemblies has usually not been carried out by the user. Instead, the assemblies are adjusted to cut a wafer of larger thickness so as to permit a subsequent polishing step. This is because permanent balancing is usually done on fabrication of the saw assembly before shipment to the user and because re-balancing has been difficult and impractical from a production standpoint for a user.

It has also been known to provide rotary saw assemblies with various types of balancing devices which can be employed from time to time in order to attempt a rebalancing of the assembly. For example, it has been known to inject small masses of water or the like onto a rotating blade mounting at a point of unbalance in order to attempt a re-balance of the assembly. Generally, this would be carried out during rotation of the blade of the assembly as the water would tend to flow under gravity when the assembly is stopped. However, such a balancing system is not of permanent nature due to the flowability of the water and the difficulty of containing the water over any period of time due, for example, to evaporation and leakage.

Accordingly, it is an object of the invention to be able to balance a rotary saw assembly during operation in a relatively easy and permanent manner.

It is another object of the invention to provide a relatively simple system of balancing a rotating saw assembly having an internal diameter blade.

It is another object of the invention to automatically balance a rotary saw assembly from time to time during operation.

It is another object of the invention to provide a rotary saw assembly which is capable of severing wafers from an ingot with smooth surfaces.

It is another object of the invention to minimize the depth of damage caused by vibrations in a rotary saw assembly.

It is another object of the invention to reduce the cost of severing wafers from crystal ingots.

Briefly, the invention provides a rotary saw assembly which includes a wheel head which is rotatably mounted about an axis of rotation and an internal diameter blade which is mounted on the wheel head with a means for transferring a mass of a fluid medium about the wheel head during rotation from a heavier unbalanced side to a lighter side in order to automatically maintain the wheel head in balance.

In one embodiment, the means for transferring the fluid medium includes an annular rotor which is mounted on the saw assembly for rotation with the wheel head. This rotor further has a plurality of circumferentially spaced chambers for receiving a vaporizable fluid balancing medium, at least one manifold tube which interconnects the chambers and a plurality of heating elements which are disposed about the respective chambers. In addition, means are provided for activating at least a selected one of the heating elements in order to vaporize at least a part of the medium in a chamber in response to an unbalance of the wheel head whereby the vaporized medium flows into at least one adjacent chamber through the manifold tube in order to balance the wheel head.

The means for activating a heating element includes a first sensor for sensing the speed of rotation and angular position of the wheel head, a second sensor for sensing a vibration of the wheel head radially of the axis of rotation of the blade, an electronic control which is connected to the sensors for determining an angular position of unbalance of the wheel head and a stator which is connected to the electronic control and which has a plurality of coils for activating the respective heating elements.

The construction of the balancing means is such as to be readily incorporated into the rotary saw assembly. Further, the balancing means can be operated from time to time via a suitable switch so that a continuous monitoring or balancing of the wheel head is not required.

During operation of the balance means, both when rotating and standing still, the capillary manifold tube serves to prevent a flow of the fluid balancing medium between the chambers. However, upon vaporization of the medium in a chamber, the pressure produced within the heated chamber is sufficient to force the vapor to flow through the capillary manifold tube.

In another embodiment, the means for transferring the fluid medium includes a plurality of circumferentially spaced chambers which are mounted on the wheel head for rotation therewith and which are sized to receive a fluid balancing medium. In addition, at least one connecting tube communicates one of these chambers with at least one other of the chambers in order to pass fluid medium therebetween. Further, a compressed air source is selectively connected to at least one of these chambers and means are provided for connecting the compressed air source to the chamber in response to an unbalance of the wheel head in order to deliver compressed air into the chamber to force the balancing medium therefrom through the connecting tube into the other chamber for balancing of the wheel head.

The chambers of the balancing means are preferably connected in opposed pairs by two connecting tubes so that balancing medium can be transferred from one chamber to the other through one tube while the other tube is able to convey the balancing fluid in an opposite sense. In addition, the means for connecting the compressed air source to the chambers includes individual supply tubes for supplying compressed air to the individual chambers.

Each connecting tube is constructed so as to project at one end into a chamber for immersion in the fluid balancing medium during rotation of the wheel head. In this way, compressed air is precluded from entering into the connecting tube. In addition, each connecting tube extends on an increasing radius of curvature from this end to the opposite end which terminates in the diametrically opposed chamber. This permits centrifugal force to convey any balancing medium in the tube during rotation into the chamber at the outlet end of the tube. In addition, a check valve is provided in each connecting tube in order to prevent a back flow.

Where the saw assembly includes a housing and a spindle which is secured to the wheel head and rotatably mounted in the housing, the air supply tubes may be led through the spindle, for example to a stationary labyrinth distributing plate seal to which stationary air lines are mounted in order to deliver air into the respective air supply tubes. Suitable valves, such as solenoid valves, may also be provided to control the flow of air through the stationary air lines. As above, means are provided for activating at least a selected one of the solenoid valves in order to deliver air into a chamber in response to an unbalance of the wheel head in the sector in which that chamber is located. In this way, the compressed air forces the balancing medium in the chamber to flow into the connecting tube and, thus, deliver a charge of medium into the diametrically opposed chamber.

The invention further provides a method of balancing a rotating wheel head of a rotary saw assembly having an internal diameter blade mounted in the wheel head. In this regard, the method comprises the steps of placing a mass of fluid balancing medium in circumferentially spaced chambers about the wheel head, determining an angular position of unbalance of the wheel head during rotation of the wheel head and thereafter transferring the fluid balancing medium from a selected chamber to at least one adjacent chamber in response to the determination of an unbalance during rotation of the wheel head in order to balance the wheel head. In accordance with the invention, transfer of the fluid balance medium can be effected by vaporizing the medium in order to effect transfer from one chamber to an adjacent chamber, or by pressurizing the medium to effect a transfer under centrifugal force.

These and other objects and advantages of the invention will become more apparent from the following detailed description taken in conjunction with the accompanying drawings wherein:

FIG. 2 illustrates an enlarged detailed view of the rotor of the balancing means in accordance with the invention;

Figure 1:
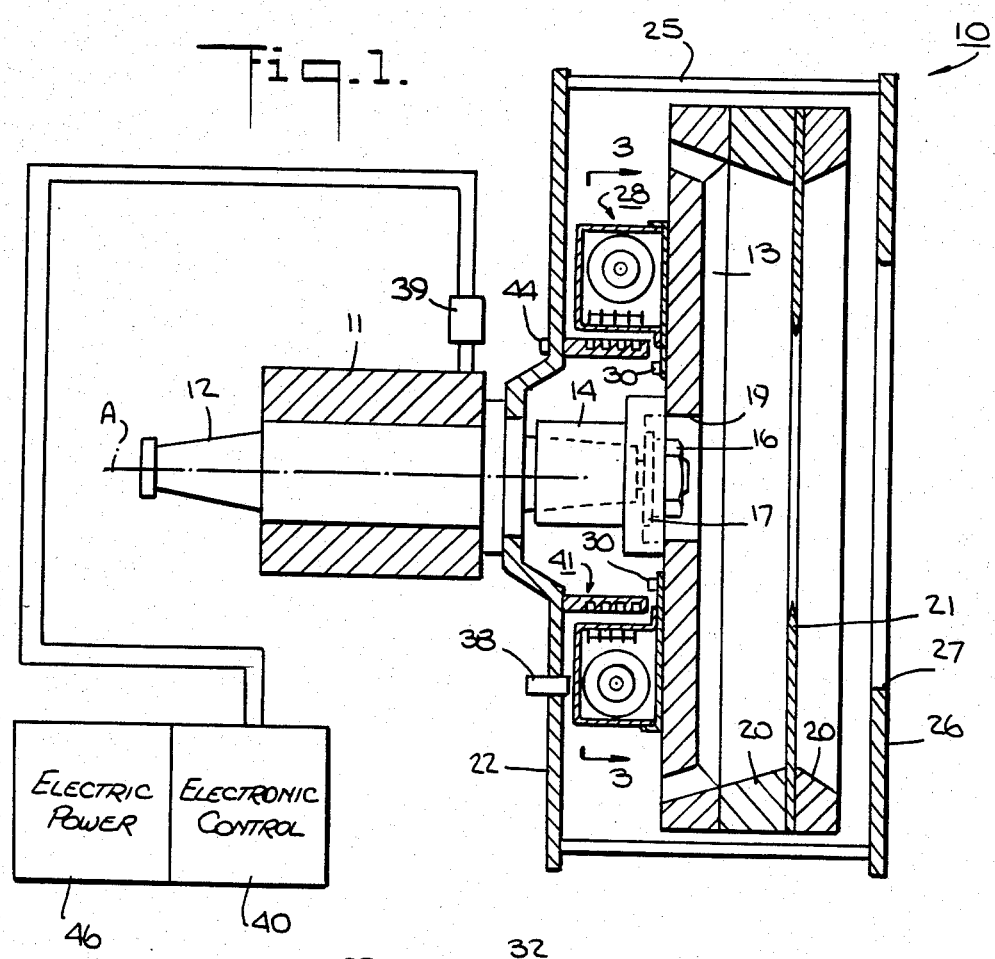
FIG. 1 illustrates a schematic cross-sectional view of a rotary saw assembly having a balancing means in accordance with the invention.

Referring to FIG. 1, the rotary saw assembly is of generally conventional structure. To this end, only those portions of the assembly required to understand the invention will be described in the following.

As illustrated, the rotary saw assembly 10 includes a housing 11, a spindle 12 which is rotatably mounted on an axis A in the housing 11 in a suitable manner and a wheel head 13 which is mounted on the spindle 12. As indicated, the end of the spindle 12 adjacent to the wheel head 13 is tapered and fits into a mating cavity of a spindle nose hub 14 secured to the wheel head 13 e.g. via bolts 15 (FIG. 2). A lock nut 16 is also threaded onto the end of the spindle 12 against a washer 17 and a shoulder 18 of the nose hub 14 to secure the wheel head 13 to the spindle 12 for rotation therewith. As indicated, the wheel head 13 has a central recess 19 to accommodate the locking nut 16.

Figure 4:
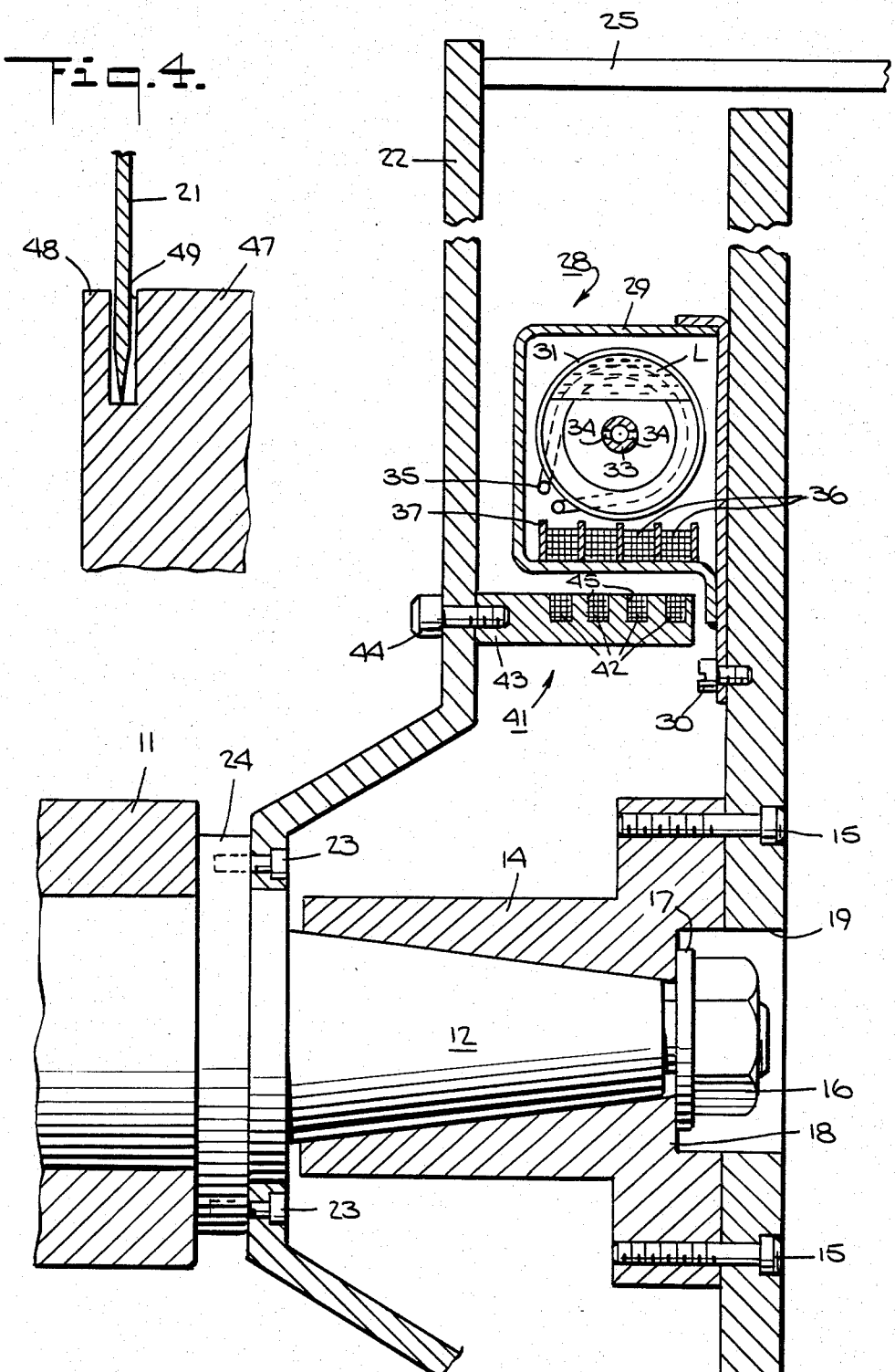
FIG. 4 illustrates an enlarged detailed view of a portion of an ingot being severed by an internal diameter cutting blade.

The saw assembly 10 also has a pair of mounting rings 20 secured to the wheel head 13 via suitable bolts (not shown) which are peripherally spaced about the rings 20 and wheel head 13. These rings 20 clamp an internal diameter blade 21 therebetween in known manner, for example in a tensioned state. The blade 21 is formed with a cutting edge on the internal periphery which may have a tapered shape as indicated in FIG. 4.

The saw assembly 10 also has a backing plate 22 which is fixedly mounted on the housing 11 via suitable bolts 23 (FIG. 2) and a spacing collar 24. The backing plate 22 carries a wheel guard 25 of cylindrical shape and a front plate 26 which is provided with a central aperture 27. As indicated in FIG. 1, the aperture 27 and the blade 21 are coaxially disposed on the axis of rotation A of the spindle 12.

Figure 3:
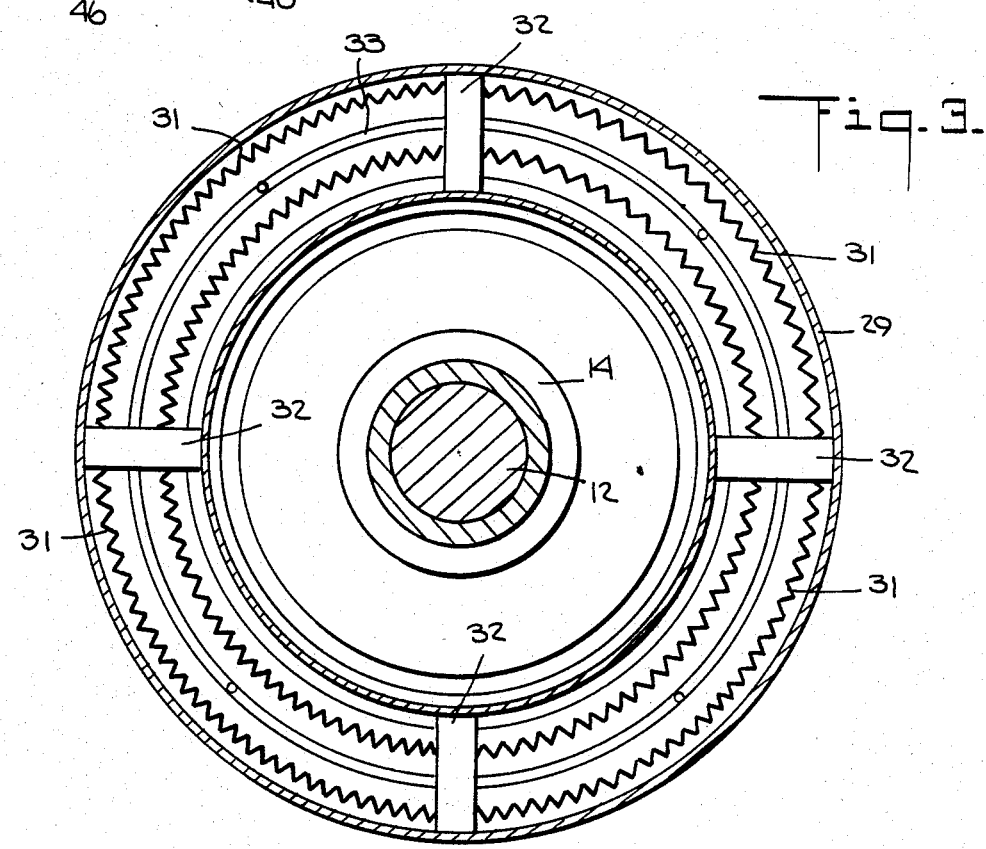
FIG. 3 illustrates a cross-sectional view through the rotor.

In addition, a balancing means is provided for automatically balancing the wheel head 13 about the axis of rotation A. Referring to FIG. 2, the balancing means includes an annular rotor 28 which includes a housing 29 mounted on the wheel head 13, for example, via circumferentially disposed bolts 30. This rotor housing 29 houses a plurality of circumferentially spaced chambers 31, for example four chambers, each of which is disposed in a respective quadrant or sector of the rotor 28 and may be formed by a flexible metal bellows. As shown in FIG. 3, a bulkhead 32 is secured in the housing 29 and to adjacent bellows 31 to seal the adjacent chambers 31 from each other. In addition, each chamber 31 is partly filled with a vaporizable fluid balancing medium, for example Freon L and communicates with the other chambers 31 via a capillary manifold tube 33. The manifold tube 33 is in the form of an annular ring which is centrally located within the respective chambers 31. In addition, the tube 33 has one or more orifices 34 within each chamber 31 to communicate each chamber 31 with the interior of the tube 33. In this way, the tube 33 connects the chambers 31 to each other in common. The tube 33 is sized so as to pass vapor but not the liquid under static and dynamic conditions.

The rotor 28 also houses a plurality of heating elements 35 each of which is in the form of a wire wrapped within the convolutions of a bellows forming a fluid-containing chamber 31. As indicated, the heating elements 35 are on the outside of the chambers 31.

The rotor 28 also includes a plurality of rotor coils 36, i.e. four coils, within the housing 29. These rotor coils 36 are separated and insulated from each other axially via suitable rings 37 and each coil 36 is connected to a respective heating element 35.

The balancing means also includes means for activating at least a selected one of the heating elements 35 in order to vaporize at least a part of the balancing medium in a chamber 31 in response to an unbalance of the wheel head 13 so that the vaporized medium flows into an adjacent chamber 31 through the manifold tube 33 in order to balance the wheel head 13. As indicated in FIG. 1, this activating means includes a sensor 38 in the form of a tachometer which is mounted in the backing plate 22 in order to sense the speed of rotation of the wheel head 13 for example the number of revolutions per minute of the wheel head 13. In addition, a second sensor 39 is mounted on the housing 11 for sensing the vibration of the housing 11, and thus, the wheel head 13, radially of the axis of rotation A. This sensor 39 may be in the form of a transducer or any other suitable structure. Both sensors 38, 39 are electrically connected to an electronic control 40 which functions to determine the magnitude and angular position of unbalance of the wheel head 13.

In addition, the activating means includes a stator 41 which is mounted on the backing plate 22 concentrically within the rotor 28. As shown in FIG. 2, the stator 41 is constructed with a plurality of coils 42 which are closely spaced to the rotor coils 36. In this regard, the stator coils 42 and the rotor coils 36 are constructed in a manner similar to the primary and secondary windings of a transformer. Further, the stator coils 42 are mounted on a ring 43 which is secured to the backing plate 22 via bolts 44. The ring 43 is provided with grooves 45 for the coils 42 so as to separate and insulate the coils from each other. Each stator coil 42 is connected via a separate connection (not shown) via the electronic control 40 to a source 46 of electrical power for purposes as explained below.

Referring to FIG. 1, during use of the saw assembly 10, an ingot is initially positioned on the axis of rotation A within the cutting edge of the blade 21. Thereafter, the saw assembly 10 moves perpendicular to the axis of the rotation A relative to the ingot. That is, either the saw assembly may move or the ingot may move. In any event, during use, as shown in FIG. 4, the blade 21 cuts through the ingot 47 to sever a wafer 48 from the leading end.

Referring to FIG. 4, as the blade 21 cuts through the ingot 47 a groove-like recess 48 is formed between the wafer 48 to be cut and the remainder of the ingot 47. So long as the blade 21 is held in a balanced condition by the wheel head 13, the groove-like recess 49 is formed with smooth side walls and a smooth base without any cracks at the corners between the base and the side walls. However, if a vibration is introduced into the blade 21, cracks may appear at the corners between the base and the side walls. As discussed above, these cracks would have to be polished from the face of the severed wafer 48 in order to provide a smooth surface on the wafer 48.

After the saw assembly 10 has been in use for a period of time, the balancing means may be activated. To this end, a suitable switch is provided to activate the electronic control 40. At this time, the tachometer 38 is able to sense the speed of rotation and angular position of the wheel head 13 and to emit a corresponding signal to the electronic control 40. Likewise, the vibration sensor 39 is able to sense a vibration of the housing 11, and thus the wheel head 13 and blade 21 perpendicular to the axis of rotation A. Upon sensing such vibration, the sensor 39 emits a corresponding signal to the electronic control 40. The electronic control 40 then filters the signal from the vibration sensor 39 so that only the vibration signal component at the same frequency as the rotational speed of the wheel head 13 is passed. The amplitude of this filtered vibration signal is proportional to the magnitude of the unbalance. The phase difference between the filtered vibration signal and angular position signal from the tachometer 38 is a measure of the angular position of the unbalance of the wheel head 13. Once determined, the source 46 of electrical power is connected to the coil 42 of the stator 41 which is associated with the quadrant of the wheel head 13 which is out-of-balance, i.e. heavier than the remainder of the wheel head quadrants. As a result, power is transferred to the associated rotor coil 36 by the magnetic field produced in the radial air gap between the two coils 36, 42. Of note, the primary and secondary coils are radially adjacent for maximum magnetic coupling. Thereafter, the associated heating element 35 heats up the balancing medium within the associated chamber 31. The vaporized medium then passes through the capillary manifold tube 33 into the adjacent chambers 31 due to the increase in pressure in the heated chamber 31. The vaporized medium then condenses in the adjacent chambers 31. In this way, a mass is transferred from the heavier quadrant into the lighter quadrants so as to bring about a balance of the wheel head 13.

As shown in FIG. 2, during rotation of the wheel head 13, the liquid L is thrown outwardly within each chamber 31 due to centrifugal force and is spaced from the manifold tube 33.

Of note, more than one heating element 35 may be activated in order to transfer the mass of fluid medium about the wheel head 13 during rotation of the wheel head 13.

Referring to FIG. 1, when the saw assembly 10 is constructed, the wheel head 13 is balanced before the balancing means is installed. Thereafter, the components of the balancing means are installed and the chamber 31 of the rotor 28 are partially filled with a vaporizable fluid balancing medium in a balanced manner. Subsequently, when a user wishes to check the balanced condition of the assembly 10, the balancing means is activated. At that time, the angular position of any unbalance of the wheel head 13 is determined dynamically, i.e., during rotation of the wheel head 13. In response to an unbalance, the fluid balancing medium is transferred from a selected chamber 31 to at least one of the adjacent chambers during continued rotation of the wheel head 13 in order to balance the wheel head 13. In this way, operation of the saw assembly need not be interrupted for a balancing operation.

The fluid medium which is used for balancing may have a relatively low atmospheric boiling point, for example 75° F. (e.g. Freon 11). Of note, during actual operation, the pressure in the chambers 31 will be precharged other then at atmospheric. Hence, the actual boiling point of the fluid medium L will be other than at normal ambient temperature. For example, at 130° F. the vapor pressure of Freon 11 equals 24 psig.

Once vaporized by a heating element 35, the vapor is forced through the capillary manifold tube 33 due to the increased pressure in the heated chamber 31. When the vapor reaches the cooler quadrants, the vapor condenses. This causes a shift of mass to an improved mechanical unbalance condition. This process is repeated a few times automatically until a very small amount of mechanical unbalance remains. Of note, the capillary manifold tube is sized and positioned so as to prevent transfer of the fluid medium when the wheel head 13 is not rotating. Thus, the wheel head 13 remains in balance after starting from a static condition.

Figure 5:
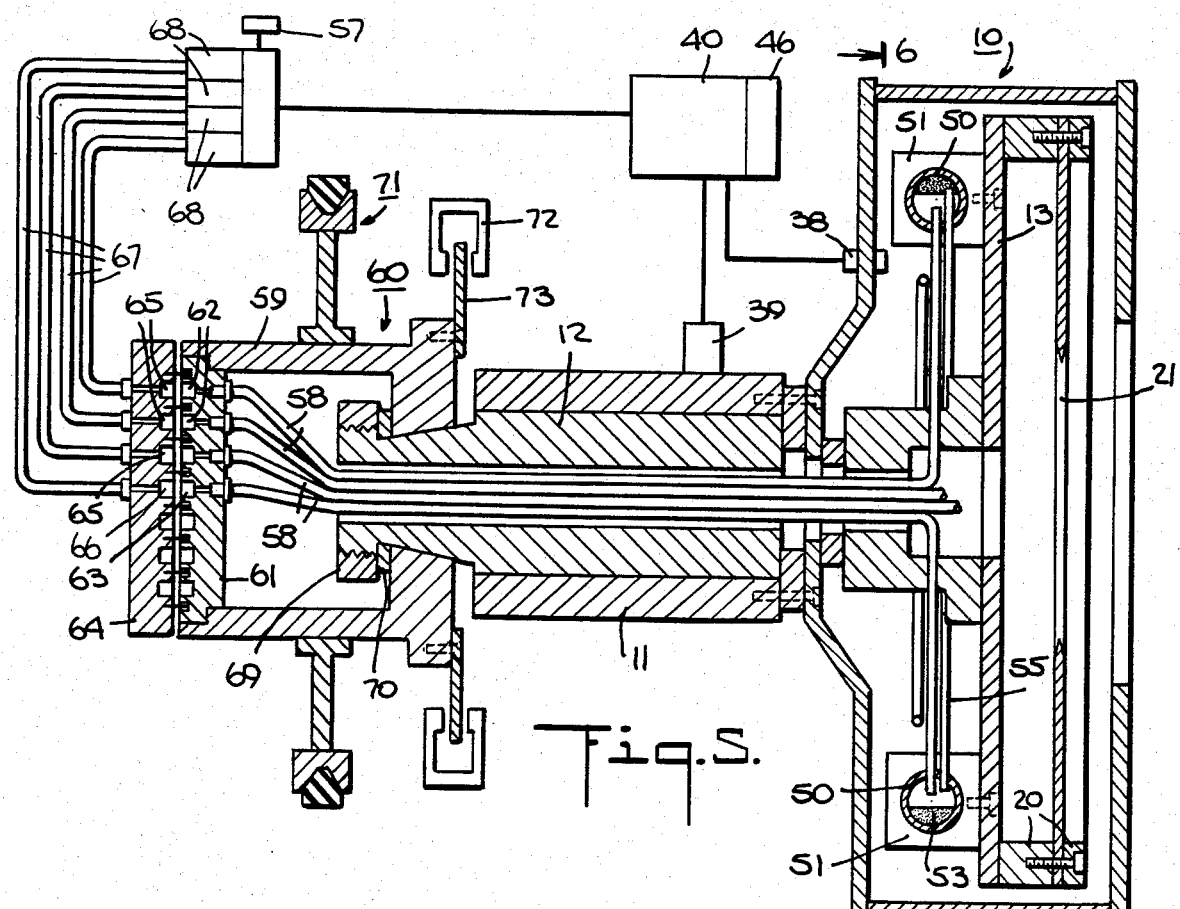
FIG. 5 illustrates a partial cross-sectional view of a rotary saw assembly having a modified balancing means in with the invention.
Figure 6:
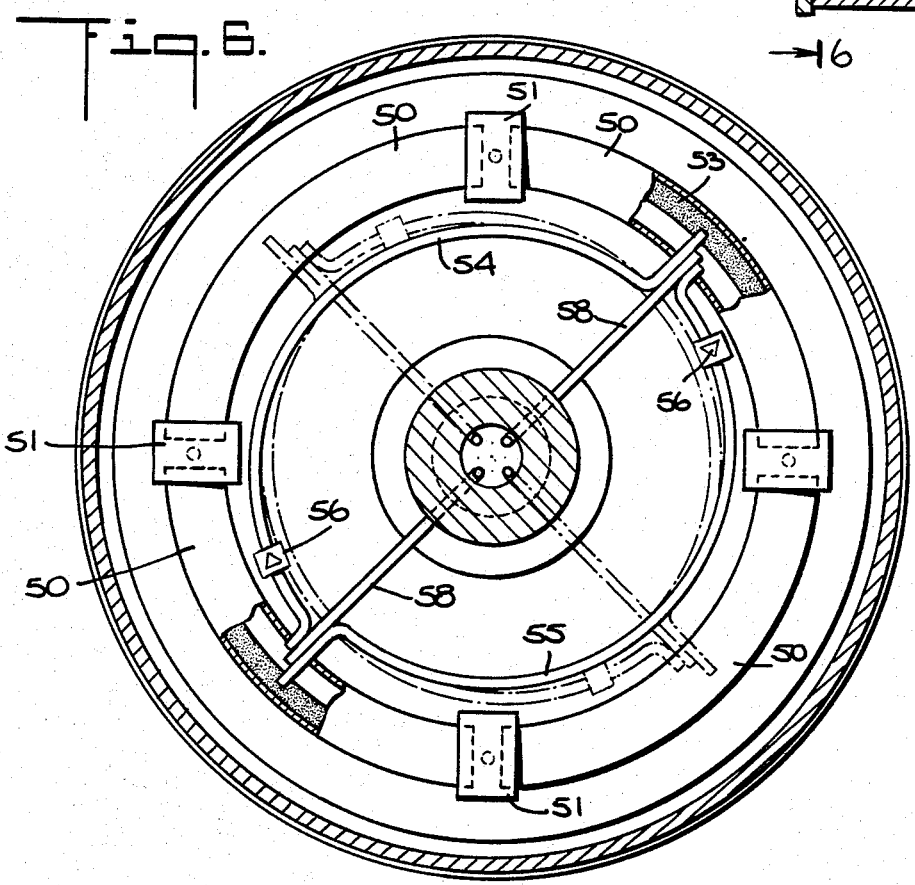
FIG. 6 illustrates a view taken on line 6—6 of FIG. 5.

Referring to FIGS. 5 and 6, wherein like reference characters indicate like parts as above, the rotary assembly 10 may be provided with a modified balancing means of simple construction. As illustrated, the balancing means includes a plurality of circumferentially spaced chambers 50 e.g. four which are mounted on the wheel head 13 via mounting blocks 51. As indicated in FIG. 6, the mounting blocks 51 are disposed at 90° spacing about the wheel head 13 and each chamber 50 is formed by a substantially cylindrical tube which is bent into an arcuate shape and which is secured at opposite ends in the respective mounting blocks 51. Each of these chambers 50 may be provided with suitable ports (not shown) for the introduction of a fluid balancing medium and for the emptying of the chambers 50 when desired. Otherwise, each chamber 50 is sealed to the surrounding environment.

As indicated in FIG. 6, each pair of diametrically opposed chambers 50 are interconnected by a pair of connecting tubes 54, 55 which serve to communicate the chambers 50 with each other in order to pass charges of the fluid medium 53 therebetween. To this end, one connecting tube 54 has a supply end which projects into a chamber 50 for immersion in the fluid balancing medium 53 during rotation of the wheel head 13 while the opposite end terminates in a wall of the opposite chamber 50. In this regard, each chamber 50 is generally filled about one third full such that during rotation, the balancing medium 53 occupies the outer third of the cross-section of a chamber while at rest, the balancing medium occupies only the lowest portions of the respective chambers without communicating with the tubes 54, 55. Further, both the supply and delivery ends of a tube 54, 55 are located generally at the mid plane of a chamber 50 in order to preclude undesired entry of the balancing medium thereinto.

As indicated in FIG. 6, each connecting tube 54, 55 is provided with a check valve 56 which serves to prevent a back flow of medium toward the supply end of the tube 54, 55. Such a valve 56 may be of any suitable construction.

Of note, the tubes for interconnecting the other two chambers 50 have been shown in dotted line in FIG. 6 for purposes of simplicity.

As shown in FIG. 6, each connecting tube 54, 55 extends on an increasing radius of curvature from the supply end to the delivery end. This permits centrifugal force to convey any balancing medium in the tube 54, 55 from the supply end to the delivery end during rotation of the wheel head 13.

Referring to FIG. 5, the balancing means is also provided with a means for connecting a compressed air source 57 to a selected chamber 50 in response to an unbalance of the wheel head 13. As indicated, this means includes a plurality of compressed air supply tubes 58 which pass through the spindle 12 and rotate therewith. Each of these supply tubes 58 communicates at one end with a respective chamber 50 in order to deliver compressed air thereto. At the opposite end, each air tube cooperates with a means for selectively supplying compressed air to the respective tubes 58.

This latter means includes a cup-shaped housing 59 which is secured on the end of the spindle 12 via a hub assembly 60 so as to rotate with the shaft 12. As indicated, each air supply tube 58 terminates in a wall 61 of the housing 59 and communicates with an annular groove 62 which is formed in the housing wall 61 on the opposite surface. Of note, the air supply tubes 58 terminate in the wall 61 so that one tube is located on the center line of the spindle 12. Hence, the three outermost air supply tubes 58 communicate with annular grooves 62 whereas the coaxially disposed tube 58 communicates with a bore 63 in the housing wall 61. In addition, a stationary labyrinth distributor plate seal 64 is disposed in facing relation to the housing wall 61. This plate seal 64 includes oppositely facing annular grooves 65 and a central bore 66 in facing relation to the grooves 62 and bore 63 in the housing 59. In addition, air lines 67 are connected to the plate seal 64 to communicate with the respective annular grooves 65 and the central bore 66. At the opposite ends, the air lines 67 terminate in valves, such as solenoid valves 68, each of which is connected to the compressed air source 57. Each solenoid valve 68 is connected to a respective air line 67 in order to control a flow of compressed air through the air line 67 to a respective supply tube 58.

As above, the balancing means also includes means for activating a selected one of the solenoid valve 68 in order to convey compressed air into a chamber 50 in response to an unbalance of the wheel head so that the pressurized medium may flow into an opposite chamber 50 through a connecting tube 54, 55 in order to balance the wheel head 13. This activating means includes a pair of sensors 38, 39, as above, which are electrically connected to an electronic control 40 which functions to determine the magnitude and angular position of unbalance of the wheel head 13.

Referring to FIG. 5, in order to determine if the wheel head 13 is out of balance during rotation, the electronic control 40 is activated. Once the angular position of the unbalance is determined, i.e. the quadrant which is out-of-balance, the electronic control 40 delivers a signal to the solenoid valve 68 associated with this quadrant. The solenoid valve 68 is then opened so that compressed air is delivered via the associated air line 67 and air supply tube 58 into the chamber 50. At this time, the increase in air pressure forces the balancing medium which has been forced outwardly under centrifugal force to be further pressured. Thus, the balancing medium is forced into the supply end of an associated connecting tube, for example connecting tube 54 in FIG. 6. As the balancing medium moves radially inwardly, as viewed, in the connecting tube 54, at least a part of the balancing medium moves into that part of the tube which is on an increasing radius. At this time, centrifugal force causes this part of the medium to move along the connecting tube 54 as a charge of medium into the opposed chamber 50. In this way, balancing medium is moved from the heavier quadrant into the lighter quadrant so as to bring about a balance of the wheel head 13.

The transfer of balancing medium from one quadrant to another can be controlled via the electronic control 40 so that a solenoid valve 68 may be turned on for short periods of time, for example for fractions of a second. This can be repeated in a trial and error logic manner until balance is achieved.

The balancing medium 53 may be of any suitable type, for example, the medium may be water or any other type of non-evaporating, non-corrosive and non-toxic medium. For example, use may be made of a silicone oil or any other suitable medium, preferably one which is lighter than water. Further, instead of using compressed air, use may be made of nitrogen or any other suitable gas. The pressure of the compressed air which is delivered into the chambers 50 may depend upon the rotational speed of the wheel head 13 and of the size of the various connecting tubes 54. For example, a compressed air source at a pressure of 20 pounds per square inch (psi) may be used, for example where the connecting tubes 54, 55 have an inside diameter of about 1/16 inch inside diameter to $\frac{1}{8}$ inch inside diameter. Likewise, the amount of fluid which is used is generally proportional to the amount of unbalance. For example, for a chamber 50 having an inside diameter of $1\frac{1}{4}$ inch and an arcuate length of about 14 to 15 inches, the fluid should fill approximately $\frac{1}{3}$ of the chamber 50.

The advantages of the pneumatic balancing means of FIGS. 5 and 6 over the balancing means of FIGS. 1 to 4 are several. First, the pneumatic balancing means does not have to contend with heating problems. That is, in the embodiment of FIGS. 1 to 4, the heating elements 35 after being shut off still retain some heat which must be dissipated so that the balancing medium may condense. This residual heat may cause a hunting in the balancing mode. This, of course, does not occur in the pneumatic balancing means. Further, the electronic control 40 can be programmed so as to use software which is less complex since there is no need to deal with time delays caused by the heating and cooling cycles of the embodiment of FIGS. 1 to 4.

Further, the pneumatic balancing means occupies a smaller space than the balancing means of FIGS. 1 to 4. Also, since the need for electrical lines is reduced, there is less chance of an electrical line malfunction.

Still further, the pneumatic balancing means provides a structure which can be easily repaired and which can be maintained at relatively low cost.

As with the embodiment of FIGS. 1 to 4, the embodiment of FIGS. 5 to 6 maintains balance during shut-down of the rotary saw assembly. That is, on start-up, the balancing medium in each of the quadrants is quickly dispersed under centrifugal force back into the balanced condition.

Referring to FIG. 5, the hub assembly 60 is secured to the spindle 12 via a lock nut 69 and washer 70 and is driven via a drive pulley 71. A brake 72 is also provided to engage a braking disc 73 on the hub assembly 60 in any suitable manner.

The invention thus provides a rotary saw assembly which has a self-contained balancing means which can be operated from time to time during operation of the saw assembly.

The invention also provides a relatively simple technique of transferring a mass from one portion of a rotating wheel head of a rotary saw assembly to another portion in order to balance the wheel head automatically.

The invention further provides a saw assembly which is able to sever wafers from an ingot without causing cracks to appear in the surfaces of the severed wafer due to vibration of the cutting blade of the assembly. As a result, the severed wafers do not require a subsequent polishing operation and can be produced at a reduced cost.

Since the balancing medium is permanently retained within the rotor, there is no wasting or contamination of the balancing medium. Further, balancing of the saw assembly can be carried out at periodic intervals over extended periods of time. This, in turn, increases the efficiency of the saw assembly in severing wafers over extended periods of time.

What is claimed is:

1. In combination
  a rotary saw assembly including a wheel head rotatably mounted about an axis of rotation and an internal diamter blade mounted on said wheel head about said axis of rotation; and
  balancing means for transferring a mass of a fluid medium about said wheel head during rotation of said wheel head from a heavier unbalanced side to a lighter side to automatically maintain said wheel head in balance, said balancing means including a plurality of circumferentially spaced chambers mounted on said wheel head for rotation therewith and sized to receive a fluid balancing medium therein, at least one connecting tube communicating one of said chambers with at least one other of said chambers to pass fluid medium therebetween, and means for connecting a compressed air source to said one chamber in response to an unbalance of said wheel head to deliver compressed air into said one chamber to force balancing medium therefrom through said connecting tube into said other chamber to balance said wheel head.

2. The combination set forth in claim 1 wherein said connecting tube projects at one end into said one chamber for immersion in a fluid balancing medium therein and terminates at an opposite end in a wall of said other chamber; said tube extending on an increasing radius of curvature from said one end to said opposite end.

3. The combination as set forth in claim 1 which further comprises a check valve in said connecting tube to prevent a back-flow into said one chamber from said other chamber.

4. In combination
  a rotary saw assembly including a wheel head rotatably mounted about an axis of rotation and an internal diameter blade mounted on said wheel head about said axis of rotation; and
  balancing means for transferring a mass of a fluid medium about said wheel head during rotation of said wheel head from a heavier unbalanced side to a lighter side to automatically maintain said wheel head in balance, said balancing means including a plurality of closed chambers mounted on said wheel head in circumferentially spaced relation and adapted to contain a fluid balancing medium, a pair of connecting tubes communicating each of two diametrically opposed chambers to transfer balancing medium therebetween, and means for connecting a compressed air source to one of said chambers in response to an unbalance of said wheel head to deliver compressed air into said one chamber to force balancing medium therefrom through one of said connecting tubes into an opposed chamber to balance said wheel head.

5. The combination as set forth in claim 4 wherein each chamber contains a charge of fluid balancing medium and one of said pair of connecting tubes for each chamber is immersed in said balancing medium and the other of said pair of connecting tubes terminates in a wall of said chamber to be spaced from said balancing medium.

6. The combination as set forth in claim 4 which further comprises a check valve in each said connecting tube to prevent a back flow between said chambers connected thereto.

7. The combination as set forth in claim 4 wherein said balancing means includes a first sensor for sensing the speed of rotation and angular position of said wheel head, a second sensor for sensing vibration of said wheel head radially of said axis of rotation, and an electronic control connected to said sensors for determining an angular position of unbalance of said wheel head, said electronic control being connected to said means for connecting a compressed air source to a respective chamber to deliver a signal thereto to permit the delivery of compressed air to a selected chamber.

8. In combination
a rotary saw assembly including a wheel head rotatably mounted about an axis of rotation and an internal diameter blade mounted on said wheel head about said axis of rotation; and
balancing means for transferring a mass of a fluid medium about said wheel head during rotation of said wheel head from a heavier unbalanced side to a lighter side to automatically maintain said wheel head in balance, said balancing means including a plurality of circumferentially spaced chambers mounted on said wheel head, a charge of balancing medium in each chamber, at least one connecting tube communicating each one of said chambers with at least one other chamber to pass balancing medium therebetween and means for selectively supplying compressed air to a respective one of said chambers to force balancing medium therefrom into said other chamber through said connecting tube therebetween.

9. The combination as set forth in claim 8 wherein said saw assembly includes a rotatably mounted spindle secured to said wheel head and said means for supplying compressed air includes a plurality of compressed air supply tubes passing through said spindle with each air supply tube communicating at one end with a respective one of said chambers and means for selectively supplying compressed air to a respective one of said air supply tubes for delivery to a respective chamber.

10. The combination as set forth in claim 9 wherein said latter means includes a stationary labyrinth distributor plate seal facing opposite ends of said air supply tubes, a plurality of air lines extending from said plate seal, each said line communicating through said plate seal with a respective one of said air supply tubes, and a plurality of solenoid valves, each said valve being connected to a respective air line to control a flow of compressed air through said air line to a respective air supply tube.

11. In combination
a rotary saw assembly including a wheel head rotatably mounted about an axis of rotation and an internal diameter blade mounted on said head about said axis of rotation; and
balancing means for transferring a mass of a fluid medium about said wheel head during rotation of said wheel head from a heavier unbalanced side to a lighter side to automatically maintain said wheel head in balance, said balancing means including a plurality of chambers on said wheel head for receiving fluid balancing medium therein and
means for delivering compressed air into at least one chamber to force fluid medium therefrom into another of said chambers.

12. A method of balancing a rotating wheel head of rotary saw assembly having an internal diameter blade mounted on said wheel head, said method comprising the steps of placing a mass of fluid balancing medium in circumferentially spaced chambers about the wheel head; determining an angular position of unbalance of the wheel head during rotation of the wheel head; and thereafter delivering compressed gas into a selected chamber to transfer the fluid balancing medium under pressure from said selected chamber to at least one adjacent chamber in response to the determination of an unbalance of the wheel head during rotation of the wheel head to balance the wheel head.

* * * * *